United States Patent
Barrier et al.

(10) Patent No.: US 12,413,299 B2
(45) Date of Patent: Sep. 9, 2025

(54) HIGH SPEED BIDIRECTIONAL TEST OF DUAL-FIBER LINK

(71) Applicant: VIAVI SOLUTIONS INC., Chandler, AZ (US)

(72) Inventors: Julien Barrier, Saint Jean Bonnefonds (FR); Olivier Receveur, Saint Marcellin en Forez (FR)

(73) Assignee: VIAVI SOLUTIONS INC., Chandler, AZ (US)

( * ) Notice: Subject to any disclaimer, the term of this patent is extended or adjusted under 35 U.S.C. 154(b) by 166 days.

(21) Appl. No.: 18/131,024

(22) Filed: Apr. 5, 2023

(65) Prior Publication Data

US 2023/0344514 A1     Oct. 26, 2023

(30) Foreign Application Priority Data

Apr. 22, 2022    (EP) ..................... 22305607

(51) Int. Cl.
    *H04B 10/071*      (2013.01)
    *G01M 11/00*      (2006.01)
    *H04B 10/40*      (2013.01)

(52) U.S. Cl.
    CPC ....... *H04B 10/071* (2013.01); *G01M 11/3136* (2013.01); *G01M 11/3154* (2013.01); *H04B 10/40* (2013.01)

(58) Field of Classification Search
    CPC .. H04B 10/071; H04B 10/40; H04B 10/2589; G01M 11/3136; G01M 11/3154; G01M 11/39
    See application file for complete search history.

(56) References Cited

U.S. PATENT DOCUMENTS

| | | | |
|---|---|---|---|
| 10,411,796 | B1 | 9/2019 | Archambault et al. |
| 11,879,802 | B2 * | 1/2024 | Perron ............... G01M 11/3154 |
| 2016/0041065 | A1 | 2/2016 | L'Heureux et al. |
| 2017/0093486 | A1 | 3/2017 | Rad et al. |
| 2019/0097719 | A1 * | 3/2019 | Chedore ............ H04Q 11/0005 |
| 2022/0416887 | A1 * | 12/2022 | Chanclou ............... H04B 10/40 |

FOREIGN PATENT DOCUMENTS

| | | |
|---|---|---|
| CN | 110794528 A | 2/2020 |
| EP | 3297182 A1 | 3/2018 |
| TW | I483016 B1 * | 5/2015 |
| WO | 9724822 A1 | 7/1997 |

OTHER PUBLICATIONS

TW_I483016_B_I—translation (Year: 2015).*

* cited by examiner

*Primary Examiner* — Michael P LaPage
*Assistant Examiner* — Carlos Perez-Guzman
(74) *Attorney, Agent, or Firm* — Mannava & Kang, P.C.

(57) ABSTRACT

In some examples, high speed bidirectional test of dual-fiber link may include providing at least one optical time-domain reflectometer (OTDR) and at least one optical data transceiver. At least one m×n optical switch may be optically connected to the at least one OTDR, the at least one optical data transceiver, and at least two fibers of a cable under test. For the m×n optical switch, m and n are at least two.

18 Claims, 13 Drawing Sheets

HIGH SPEED BIDIRECTIONAL TEST OF DUAL-FIBER LINK

PRIORITY

This patent application claims priority under 35 U.S.C. 119 (a)-(d) to European patent application number 22305607.8, having a filing date of Apr. 22, 2022, the disclosure of which is hereby incorporated by reference in its entirety.

BACKGROUND

A fiber optic cable may include one or more optical fibers that may be used to transmit light from a source to a destination. The optical fibers of the fiber optic cable may be referred to as fiber optic links. Fiber optic cables may represent a network element of a fiber optic network. In this regard, other types of network elements may include optical connectors, optical splices, optical couplers, and optical switches. Testing of the fiber optic link may be needed for installation, and other purposes.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
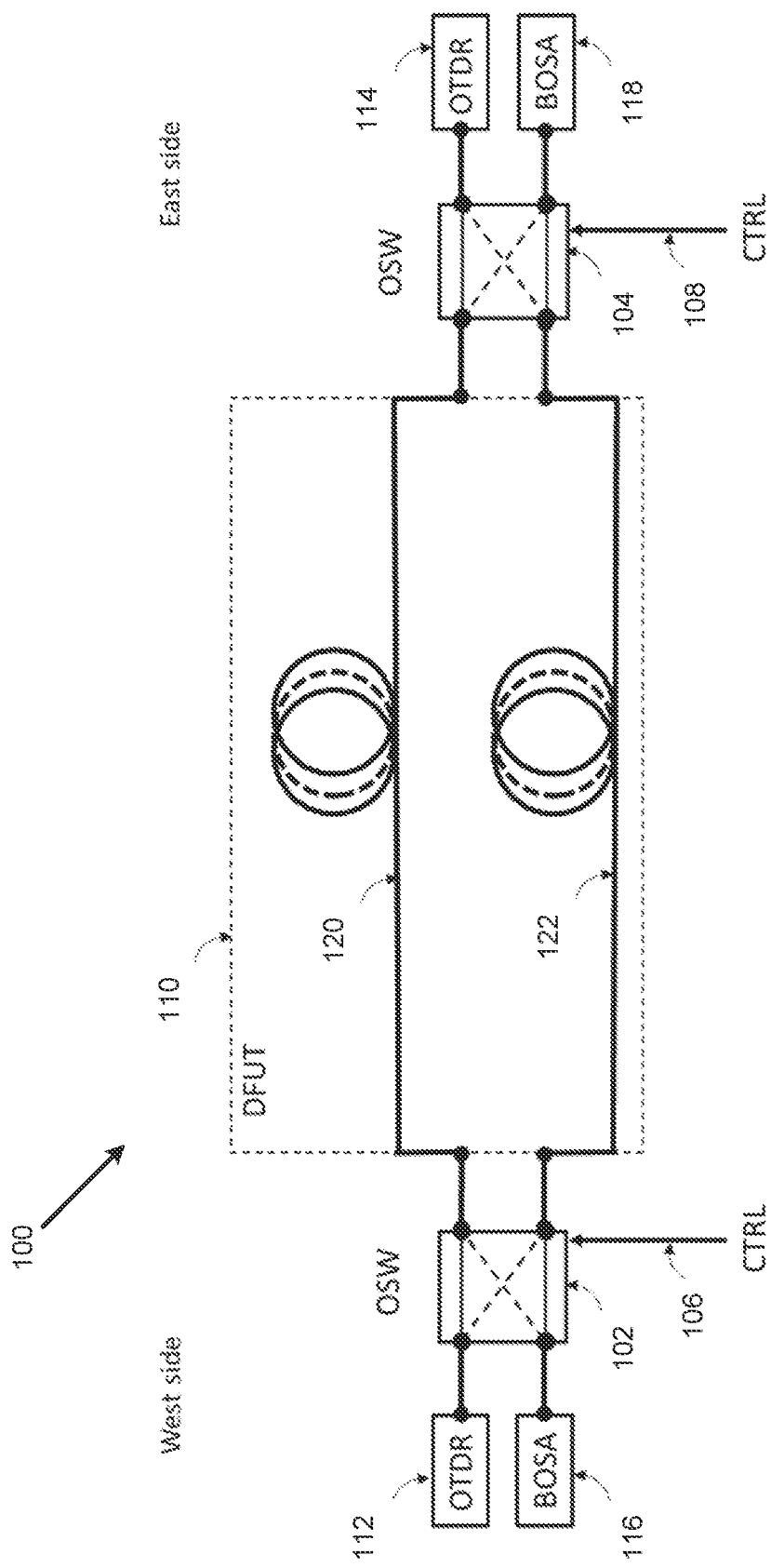
FIG. 1 illustrates a layout of a high speed bidirectional test of dual-fiber link apparatus, in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

High speed bidirectional test of dual-fiber link apparatuses, and methods for high speed bidirectional test of dual-fiber link are disclosed herein. The apparatuses and methods disclosed herein provide for reduction in the time required for measurement and data exchange in the case of dual-fiber links.

As disclosed herein, testing of the fiber optic link may be needed for installation thereof. For increased measurement reliability, a bidirectional test may need to be performed. However, the need to measure in both directions may increase the measurement time, particularly when cables with a large number of fibers are to be measured. The measurement time may thus become a key parameter that may need to be reduced. In the case of bidirectional measurements, the measurement time may integrate the time allocated to the exchange of data between devices located at two ends of an optical link.

The test of an optical fiber link may be performed by bidirectional measurements using two OTDRs connected to both ends of the optical fiber. Bidirectional measurement may make it possible to combine two OTDR measurements in order to improve their precision, particularly at the level of optical splice measurements. In this regard, the round-trip measurements may make it possible to eliminate the errors linked to the presence of the connection of fiber trunks presenting different backscattering coefficients.

According to examples disclosed herein, a high speed bidirectional test of dual-fiber link apparatus may include at least one OTDR, and at least one optical data transceiver. At least one m×n optical switch may be optically connected to the at least one OTDR, the at least one optical data transceiver, and at least two fibers of a cable under test. For the m×n optical switch, m and n are at least two. In one example, m may be two, and n may be two. In another example, m may be two, and n may be greater than two. In a yet further example, m and n may be greater than two.

For the high speed bidirectional test of dual-fiber link apparatus described above, the at least one optical data transceiver may include a Bidirectional Optical Sub-Assembly (BOSA).

For the high speed bidirectional test of dual-fiber link apparatus described above, the at least one OTDR may include a multi-fiber OTDR.

For the high speed bidirectional test of dual-fiber link apparatus described above, the at least one m×n optical switch may be operable in at least two modes, where a first mode of the at least two modes may authorize a fiber of the at least two fibers to communicatively connect to the at least one OTDR. Further, the first mode of the at least two modes may authorize another fiber of the at least two fibers to communicatively connect to the at least one optical data transceiver.

For the high speed bidirectional test of dual-fiber link apparatus described above, a second mode of the at least two modes may authorize the another fiber of the at least two fibers to communicatively connect to the at least one OTDR, and the second mode of the at least two modes may authorize the fiber of the at least two fibers to communicatively connect to the at least one optical data transceiver.

For the high speed bidirectional test of dual-fiber link apparatus described above, a fiber of the at least two fibers may be optically connected to another fiber of the at least two fibers by a loopback.

According to examples disclosed herein, a high speed bidirectional test of dual-fiber link apparatus may include a first m×n optical switch optically connected to a first OTDR and a first optical data transceiver. A second m×n optical switch may be optically connected to a second OTDR and a second optical data transceiver. The first and second m×n optical switches may be respectively optically connected to first and second opposite ends of at least two fibers of a cable under test. For the m×n optical switch, m and n are at least two.

For the high speed bidirectional test of dual-fiber link apparatus described above, each of the first and second optical data transceivers may include a BOSA.

For the high speed bidirectional test of dual-fiber link apparatus described above, each of the first and second OTDRs may include a multi-fiber OTDR.

For the high speed bidirectional test of dual-fiber link apparatus described above, each of the first and second m×n optical switches may be operable in at least two modes. A first mode of the at least two modes may authorize a fiber of the at least two fibers to communicatively connect to the first and second OTDRs, and the first mode of the at least two modes may authorize another fiber of the at least two fibers to communicatively connect to the first and second optical data transceivers.

For the high speed bidirectional test of dual-fiber link apparatus described above, a second mode of the at least two modes may authorize the another fiber of the at least two fibers to communicatively connect to the first and second OTDRs. The second mode of the at least two modes may authorize the fiber of the at least two fibers to communicatively connect to the first and second optical data transceivers.

For the high speed bidirectional test of dual-fiber link apparatus described above, a fiber of the at least two fibers may be optically connected to another fiber of the at least two fibers by a loopback.

According to examples disclosed herein, a method for high speed bidirectional test of dual-fiber link may include optically connecting at least one m×n optical switch to at least one OTDR. For the m×n optical switch, m and n are at least two. The method may include optically connecting the at least one m×n optical switch to at least one optical data transceiver. Further, the method may include testing, based on the optical connection of the at least one m×n optical switch to the at least one OTDR and to the at least one optical data transceiver, at least two fibers of a cable under test.

For the method described above, the method may further include operating the at least one m×n optical switch in a first mode that authorizes a fiber of the at least two fibers to communicatively connect to the at least one OTDR, and another fiber of the at least two fibers to communicatively connect to the at least one optical data transceiver.

For the method described above, the method may further include operating the at least one m×n optical switch in a second mode that authorizes the another fiber of the at least two fibers to communicatively connect to the at least one OTDR, and the fiber of the at least two fibers to communicatively connect to the at least one optical data transceiver.

For the method described above, testing, based on the optical connection of the at least one m×n optical switch to the at least one OTDR and to the at least one optical data transceiver, the at least two fibers of the cable under test, may further include performing a bidirectional measurement by simultaneously testing each fiber of the at least two fibers of the cable under test in a first direction, and simultaneously testing each fiber of the at least two fibers of the cable under test in a second opposite direction.

For the method described above, the method may further include exchanging, via a fiber of the at least two fibers, measurement data related to the simultaneous testing in the first direction.

For the method described above, the method may further include exchanging, via another fiber of the at least two fibers, measurement data related to the simultaneous testing in the second direction.

Figure 2:
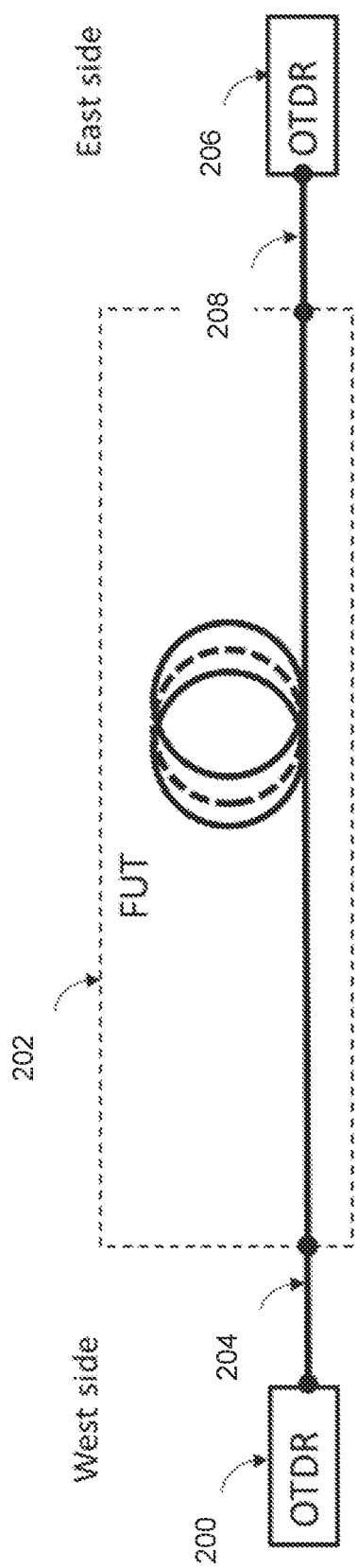
FIG. 2 illustrates an example of a configuration of a bidirectional measurement, in accordance with an example of the present disclosure.

FIG. 2 illustrates an example of a configuration of a bidirectional measurement, in accordance with an example of the present disclosure;

Referring to FIG. 2, on the west side, an OTDR 200 may be connected to a fiber under test (FUT) 202 via an optical launch cable 204. On the east side, a second OTDR 206 may be connected to the other end of the optical fiber under test 202 via an optical receive cable 208.

The measurement sequence may begin with the measurement performed by the OTDR 200, and continue with the exchange of control signals and measurement data between the two OTDRs 200 and 206. After this exchange of the control signal, the OTDR 206 may perform a reflectometric measurement which will be followed by data exchange between the two OTDRs 200 and 206. This sequential measurement may use the fiber under test 202 to exchange the measurement data between the two measurement devices.

The total measurement time may therefore be the sum of the two acquisitions of the two OTDR measurements plus the time allocated to data exchanges via the fiber under test 202.

Figure 3:
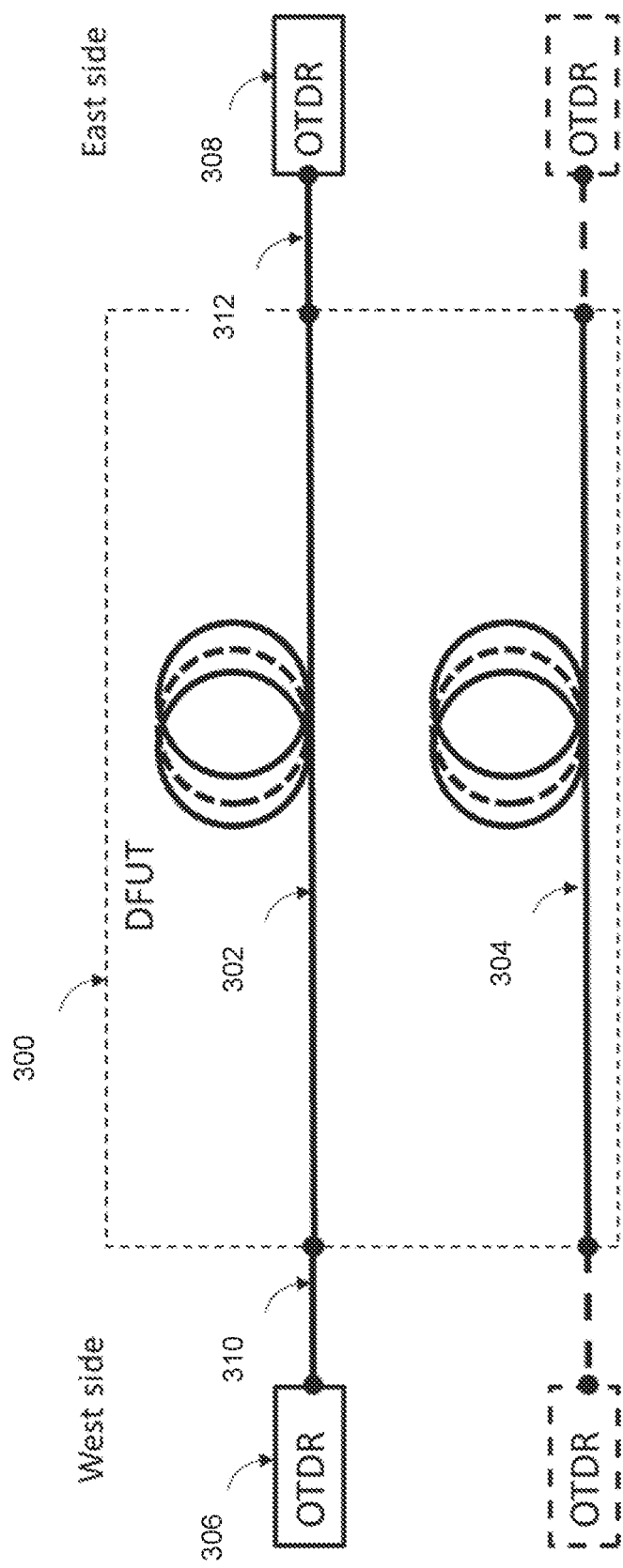
FIG. 3 illustrates a pair of optical fibers under test, in accordance with an example of the present disclosure.

FIG. 3 illustrates a pair of optical fibers under test, in accordance with an example of the present disclosure.

The test sequence may be the same in the case of testing a link using two parallel optical fibers (dual-fiber link). Referring to FIG. 3, FIG. 3 illustrates the pair of optical fibers under test 300 composed of fibers 302 and 304. Fiber 302 may be tested in bidirectional mode using OTDRs 306 and 308. These same two OTDRs 306 and 308 may then be connected to the second fiber 304 to perform the second bidirectional measurement.

The measurement time associated with the setup of FIG. 3 will thus be doubled compared to a bidirectional measurement carried out on a single fiber as shown in FIG. 2. The OTDR acquisitions and information exchanges between OTDRs 306 and 308 may take place on the same fiber, e.g., fiber 302 then 304. The measurement time may be determined as the sum of the two acquisitions of the two OTDR measurements plus the time allocated to data exchanges via the fiber under test, and further the time to disconnect cables 310 and 312 from fiber 302 before reconnecting these cables on each side of fiber 304.

Figure 4:
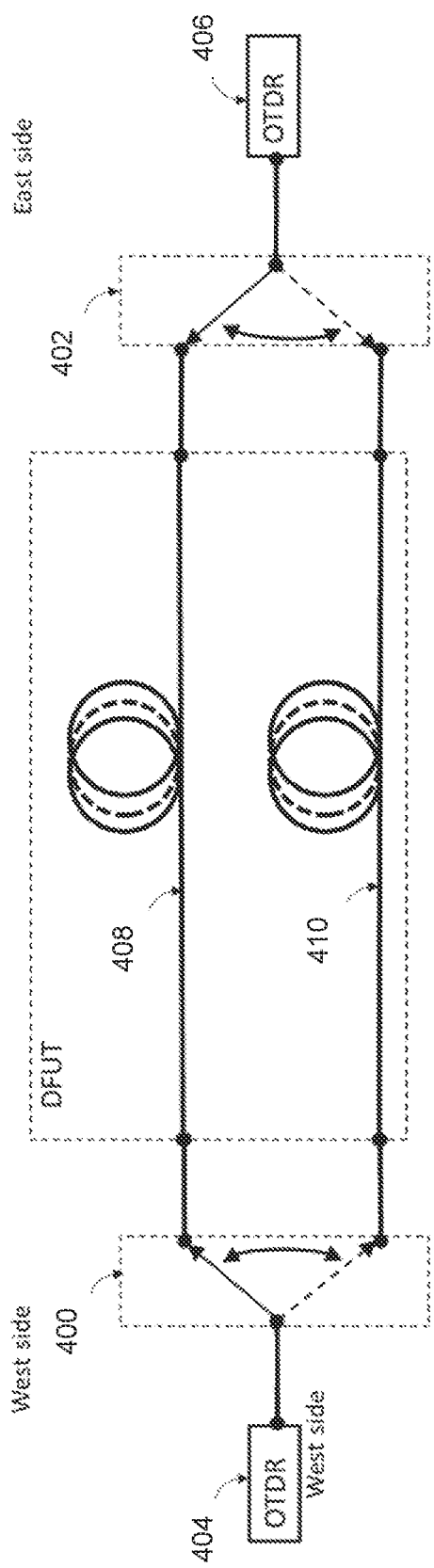
FIG. 4 illustrates a configuration of automated bidirectional measurements, in accordance with an example of the present disclosure.

FIG. 4 illustrates a configuration of automated bidirectional measurements, in accordance with an example of the present disclosure.

The use of an optical switch may automate the sequence for such optical fiber tests. For example, referring to FIG. 4, FIG. 4 shows a configuration of these automated bidirectional measurements. Compared to FIGS. 2 and 3, the switches 400 and 402 may provide for automatic (e.g., without human intervention) sequencing of the bidirectional test of the two fibers of the dual-fiber link. The measurements performed by the OTDRs 404 and 406, and the data exchanges between this same pair of OTDRs may be performed sequentially. The total duration of the sequence may remain the sum of the two acquisitions of the two OTDR measurements, plus the time allocated to data exchanges via the fiber under test. This configuration using an optical switch may utilize a prior phase of correct positioning of the switches so that they are switched over to the same fiber 408 or 410.

Figure 5:
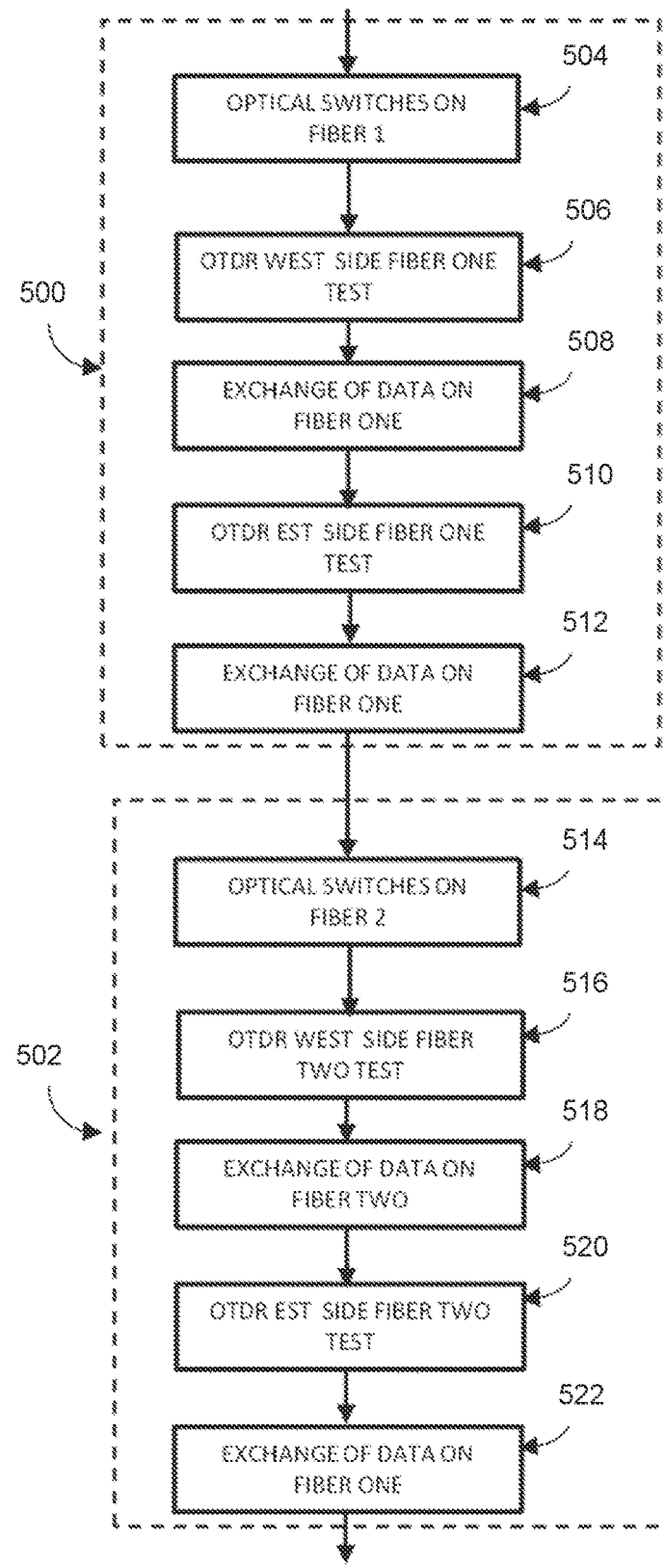
FIG. 5 illustrates a measurement sequence, in accordance with an example of the present disclosure.

FIG. 5 illustrates a measurement sequence, in accordance with an example of the present disclosure.

Referring to FIG. 5, the dual-fiber link test sequence may include the test of the first fiber 500, followed by the test of the second fiber 502. Each of these tests 500 and 502, respectively, may include the switching of the optical switch on the fiber concerned 504 and 514, respectively, followed by the reflectometric measurement from the first end 506 and 516, respectively. Further, the tests may include the data exchange on the fiber under test 508 and 518, respectively, and then reflectometric measurement from the second end 510 and 520, respectively. Finally, the tests may end with the second phase of data exchange on the fiber under test 512 and 522, respectively. The order in which these different steps of the sequence are linked may vary.

FIG. 1 illustrates a layout of a high speed bidirectional test of dual-fiber link apparatus 100 (hereinafter apparatus 100), in accordance with an example of the present disclosure.

Specifically, referring to FIG. 1, the apparatus 100 may include at least one OTDR (e.g., OTDRs 112 and 114), and at least one optical data transceiver (e.g., integrated Bidirectional Optical Sub-Assembly (BOSA) components 116 and 118). At least one m×n optical switch (e.g., 102 and 104) may be optically connected to the at least one OTDR, the at least one optical data transceiver, and at least two fibers (e.g., 120 and 122) of a cable under test (e.g., dual-fiber link 110). For the m×n optical switch, m and n are at least two. In one example as shown in FIG. 1, m may be two, and n may be two. In another example, m may be two, and n may be greater than two. In a yet further example, m and n may be greater than two.

With continued reference to FIG. 1, for the dual-fiber link test as disclosed herein, both fibers may be utilized simultaneously. Two 2×2 optical switches 102 and 104 with control (CTRL) lines 106 and 108 may be connected on either side of the dual-fiber link 110 (e.g., cable under test or FUT). OTDRs may be positioned at the two ends of the dual-fiber link 110. Specifically, the OTDRs 112 and 114, and data transmitters/receivers that may use integrated BOSA components 116 and 118 may be positioned at the two ends of the dual-fiber link 110. The dual-fiber link 110 may include the fibers 120 and 122.

Figure 6A:
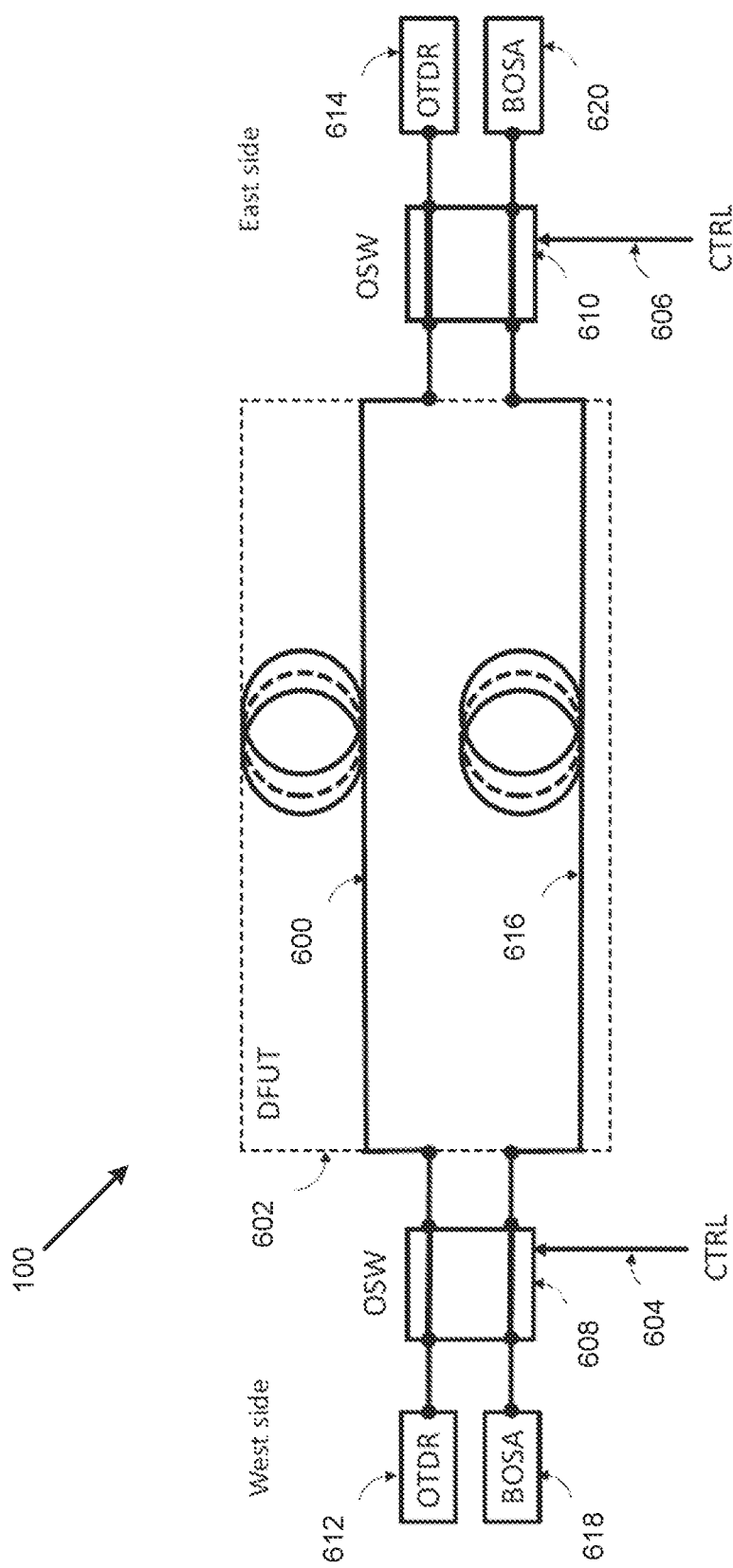
FIG. 6A illustrates testing of a first fiber of a dual-fiber link while a second fiber is used for data exchange, in accordance with an example of the present disclosure.

FIG. 6A illustrates testing of a first fiber of a dual-fiber link (e.g., of FIG. 1) while a second fiber is used for data exchange, in accordance with an example of the present disclosure. For FIGS. 6A-6D, the features of FIG. 1 are re-labeled as shown.

Referring to FIGS. 1 and 6A, for the apparatus 100, the at least one m×n optical switch (e.g., 102 and 104, or 608 and 610) may be operable in at least two modes, where a first mode of the at least two modes may authorize a fiber of the at least two fibers to communicatively connect to the at least one OTDR. Further, the first mode of the at least two modes may authorize another fiber of the at least two fibers to communicatively connect to the at least one optical data transceiver. A second mode of the at least two modes may authorize the another fiber of the at least two fibers to communicatively connect to the at least one OTDR, and the second mode of the at least two modes may authorize the fiber of the at least two fibers to communicatively connect to the at least one optical data transceiver.

The apparatus 100 may further provide for testing, based on an optical connection of the at least one m×n optical switch to the at least one OTDR and to the at least one optical data transceiver, the at least two fibers of the cable under test, by performing a bidirectional measurement by simultaneously testing each fiber of the at least two fibers of the cable under test in a first direction, and simultaneously testing each fiber of the at least two fibers of the cable under test in a second opposite direction. The testing may further include exchanging, via a fiber of the at least two fibers, measurement data related to the simultaneous testing in the first direction. Yet further, the testing may include exchanging, via another fiber of the at least two fibers, measurement data related to the simultaneous testing in the second direction.

With continued reference to FIGS. 1 and 6A, FIG. 6A describes the step of testing the first fiber 600 of the dual-fiber link 602 while the second fiber 616 is used for data exchange. Control signals 604 and 606 may be sent to switches 608 and 610, respectively, so that switches are in a bar-state. The forward measurement may be performed using the OTDR 612 which tests the fiber 600 via the switch 608, while the reverse measurement may be performed using the OTDR 614 via the optical switch 610. Data exchange on the second fiber 616 may be performed between the BOSA transceivers 618 and 620.

Figure 6B:
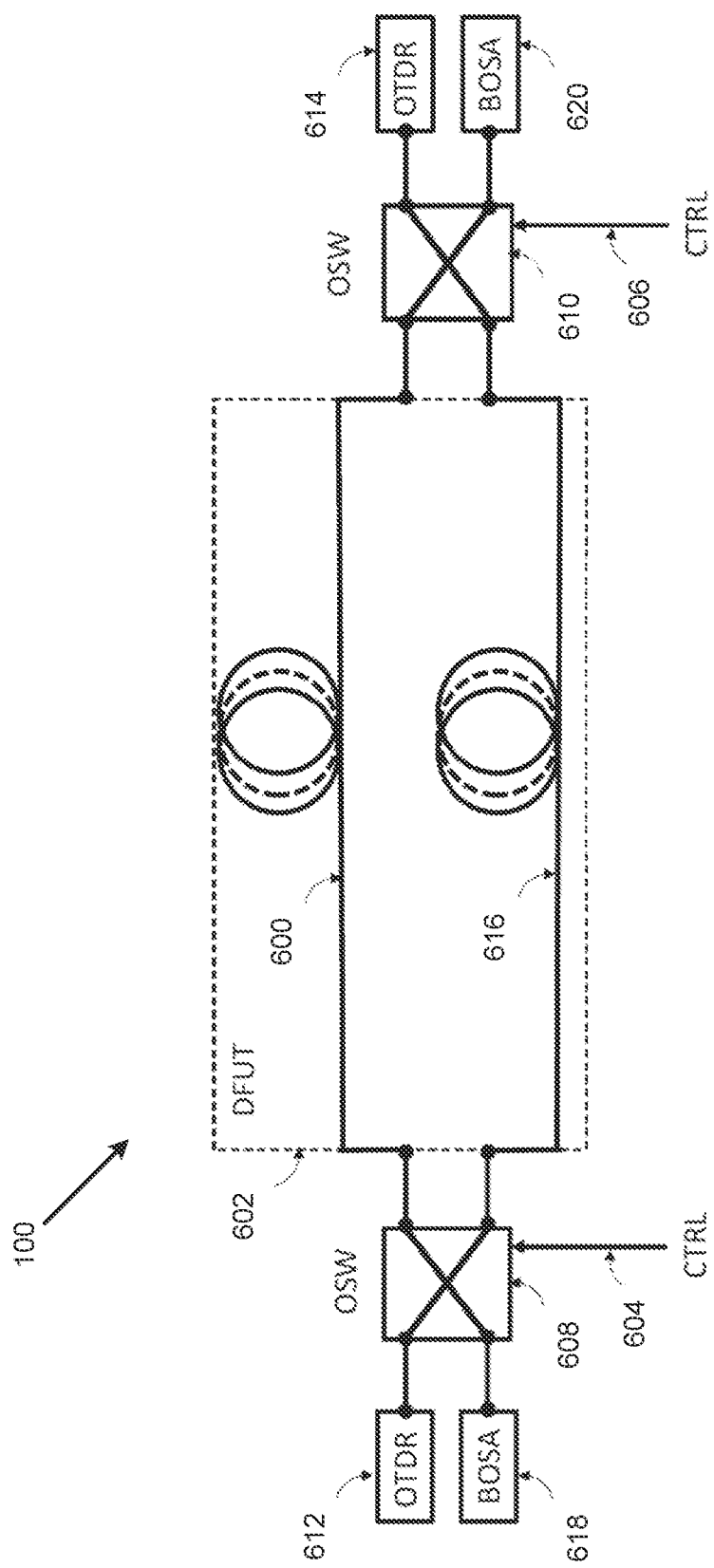
FIG. 6B illustrates testing of a second fiber of a dual-fiber link while a first fiber is used for data exchange, in accordance with an example of the present disclosure.

FIG. 6B illustrates testing of a second fiber of a dual-fiber link (e.g., of FIG. 1) while a first fiber is used for data exchange, in accordance with an example of the present disclosure.

Referring to FIGS. 1, 6A, and 6B, FIG. 6B describes the step of testing the second fiber 616 of the dual-fiber link 602 while the first fiber 600 is used for data exchange. The control signals 604 and 606 may be changed so that the switches 608 and 610 are in a cross state. The forward measurement may be performed using the OTDR 612 which tests the fiber 616 via the switch 608, while the measurement on the other side may be performed using the OTDR 614 via the optical switch 610. Data exchange on the first fiber 600 may be performed between the BOSA transceivers 618 and 620.

The configuration of FIG. 1 (as also illustrated in FIGS. 6A and 6B) provides for one fiber to be measured while the other is used for data exchange. These steps may take place in parallel and not one after the other, reducing the time for the complete measurement. When two OTDRs are connected to both ends of the same fiber (e.g., FIGS. 6A and 6B), the one-way tests (west to east, and east to west) may not interfere with each other, and therefore may be performed one after the other.

Figure 6C:
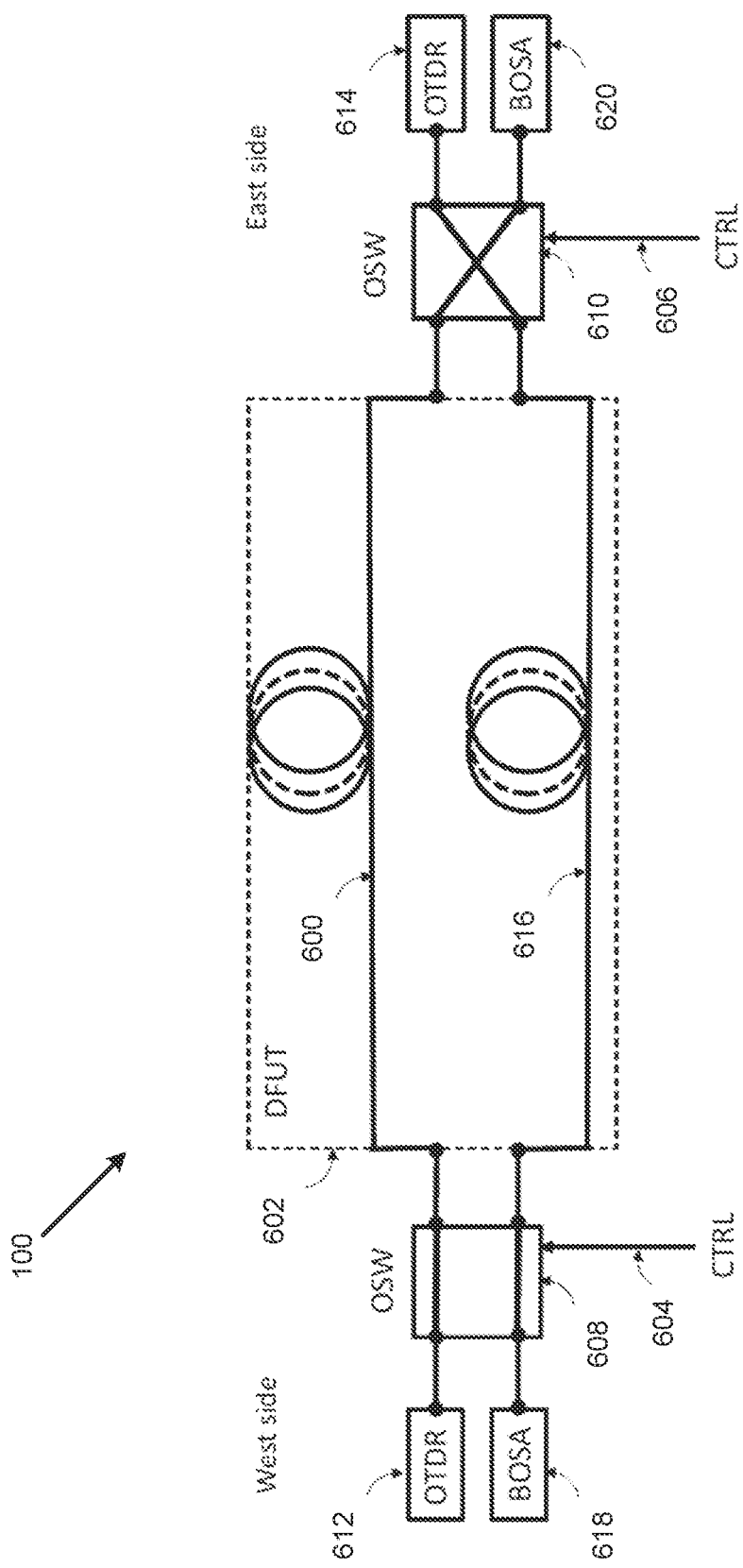
FIG. 6C illustrates a configuration for which a duration of an optical time-domain reflectometer (OTDR) measurement is greater than a duration of data exchange, in accordance with an example of the present disclosure.

FIG. 6C illustrates a configuration for which a duration of an OTDR measurement is greater than a duration of data exchange, in accordance with an example of the present disclosure.

Referring to FIGS. 1 and 6A-6C, the operating mode described in FIGS. 6A and 6B makes it possible to successively perform the bidirectional test of the first fiber and then the test of the second fiber. The two OTDRs 612 and 614 may be connected to the ends of the same fiber (either fiber 600 or fiber 616), and the duration of the bidirectional measurement of a fiber may be at least the sum of the two monodirectional measurements. This duration may thus be doubled for the test of the two fibers. When two OTDRs are connected to both ends of the same fiber, the one-way tests (west to east and east to west) may not interfere with each other, and therefore may be performed one after the other.

Figure 6D:
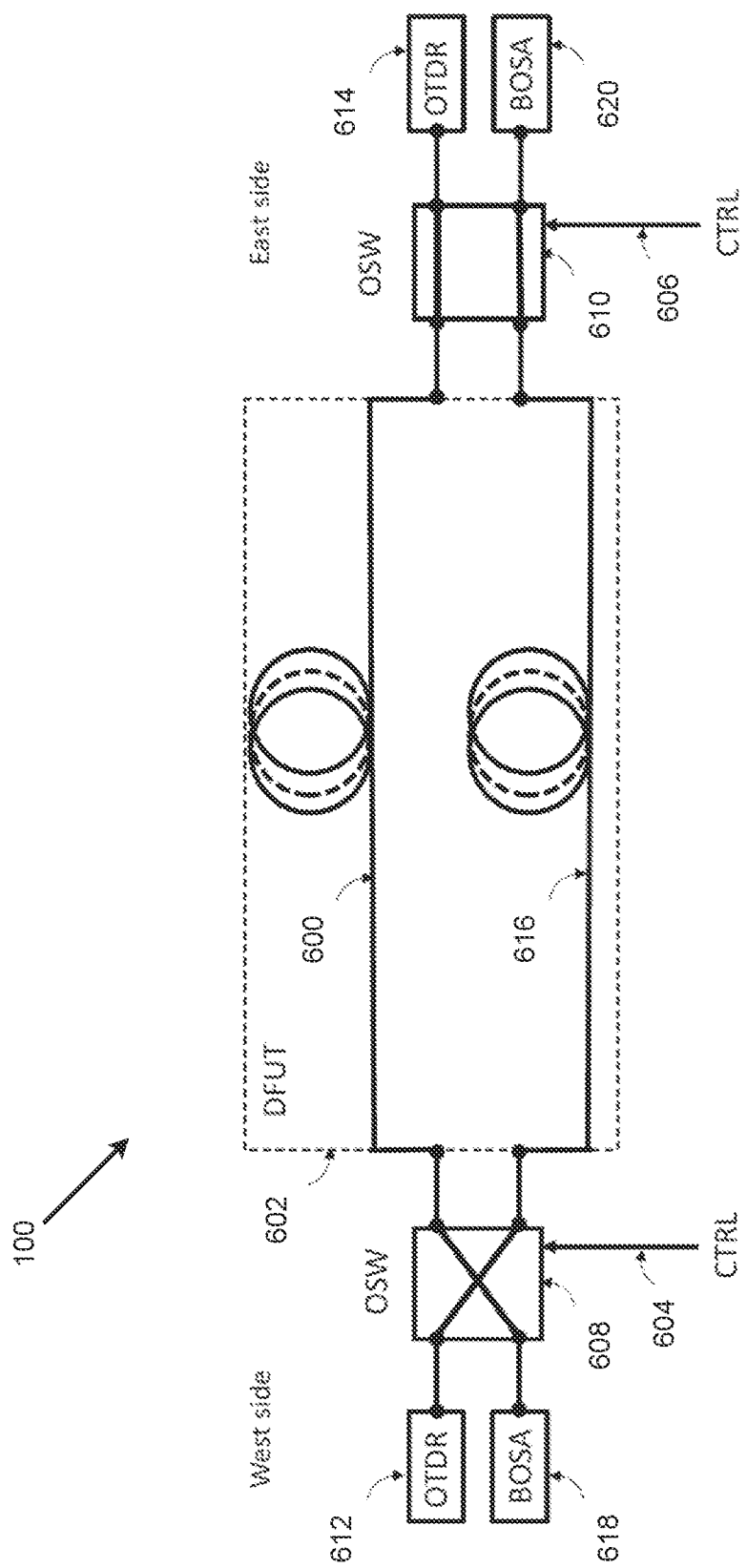
FIG. 6D illustrates a configuration for which the optical switches are reversed compared to the configuration in FIG. 6C, in accordance with an example of the present disclosure.

FIG. 6D illustrates a configuration for which the optical switches are reversed compared to the configuration in FIG. 6C, in accordance with an example of the present disclosure.

Referring to FIGS. 1 and 6A-6C, in the configuration of FIG. 6C, the configuration of optical switches 608 and 610 allows OTDR 612 to test fiber 600 from the west side, while OTDR 614 tests fiber 616 from the east side. Thus, the two reflectometric measurements may be performed in parallel. Then, as shown in FIG. 6D, the configuration of optical switches 608 and 610 may be reversed compared to their configuration in FIG. 6C. Switch 608 may be placed in cross configuration while switch 610 may be placed in direct parallel configuration. In this new configuration, as shown in FIG. 6D, the cross configuration of optical switch 608 allows OTDR 612 to test fiber 616 from the west side, while OTDR 614 tests fiber 600 from the east side. The sequence of the two configurations, as shown in FIGS. 6C and 6D, thus make it possible to perform bidirectional reflectometric tests in the two fibers 600 and 616. Then, the two switches may adopt the same configuration (either both in crossed configuration, or both in direct parallel configuration) to connect the two BOSAs 618 and 620 to allow data exchange.

In the operating mode based on configurations 6C and 6D the OTDR measurements are performed in just two OTDR acquisition time slots (1 time slot combining two OTDR monodirectional measurements performed in parallel, each OTDR testing one of the two fibers, followed by a second time slot during which each OTDR testing the fiber it had not yet tested). In the operating mode based on configurations 6A and 6C, it should be noted that in the operating mode based on configurations 6A and 6B, the OTDR measurements require four OTDR acquisition periods For the configurations of FIGS. 1 and 6A-6D, bidirectional measurement may be performed using a single OTDR, but with looping back of the two fibers at the other end.

Figure 7A:
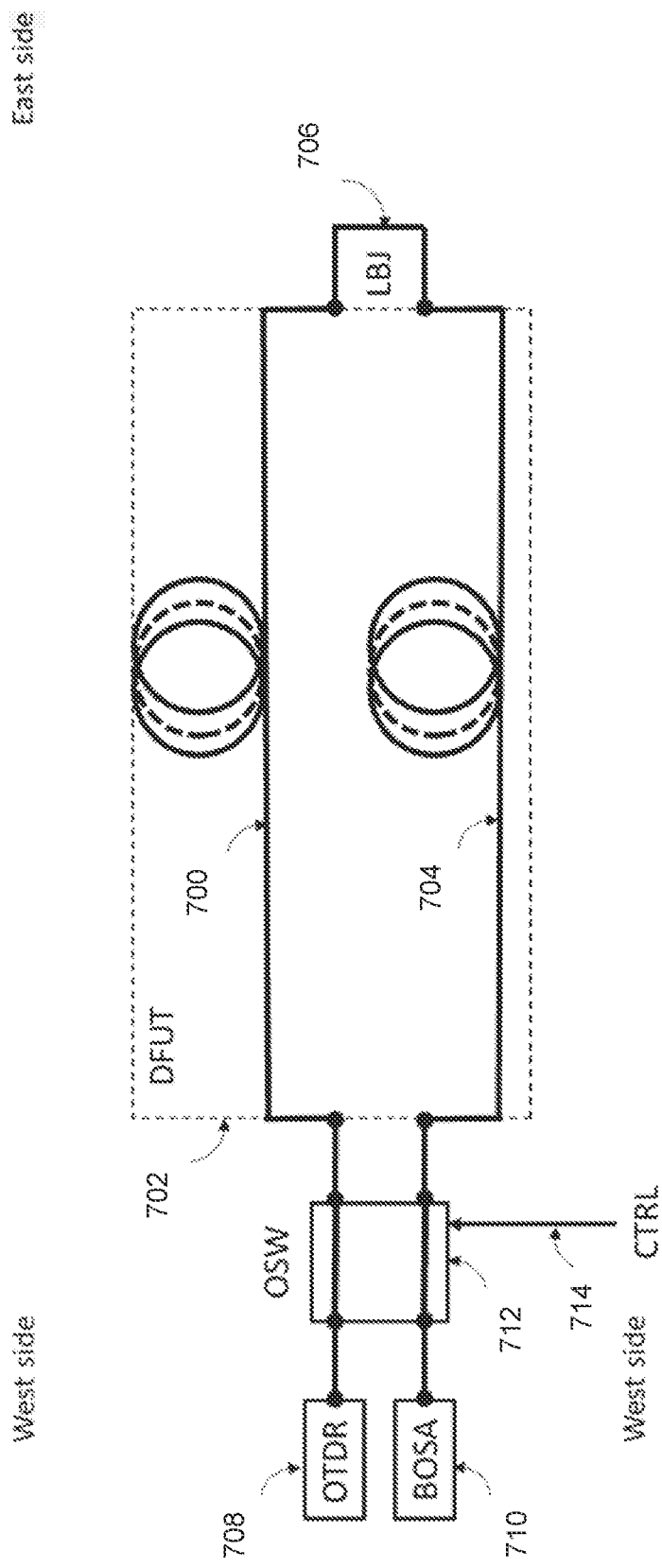
FIG. 7A illustrates testing of a first fiber of a dual-fiber in a forward direction and serial testing of a second fiber in a return direction based on a loopback, in accordance with an example of the present disclosure.
Figure 7B:
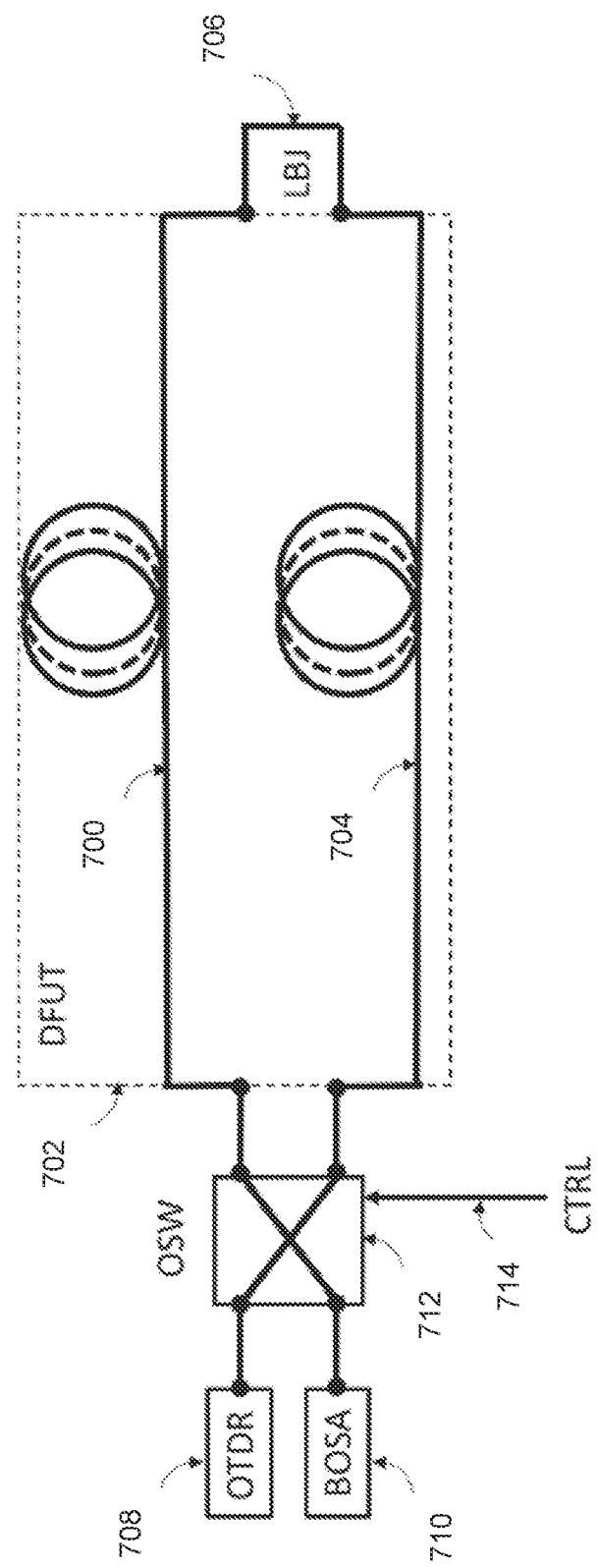
FIG. 7B illustrates testing of a second fiber of a dual-fiber in a forward direction and serial testing of a first fiber in a return direction based on a loopback, in accordance with an example of the present disclosure.

FIG. 7A illustrates testing of a first fiber of a dual-fiber in a forward direction and serial testing of a second fiber in a return direction based on a loopback, in accordance with an example of the present disclosure. FIG. 7B illustrates testing of a second fiber of a dual-fiber in a forward direction and serial testing of a first fiber in a return direction based on a loopback, in accordance with an example of the present disclosure.

Specifically, referring to FIG. 7A, the first fiber 700 of the dual-fiber link 702 may be tested in the forward direction, and the second fiber 704 may be tested (serially) in the return direction based on the loopback 706. Similarly, referring to FIG. 7B, the second fiber 704 of the dual-fiber link 702 may be tested in the forward direction, and the first fiber 700 may be tested (serially) in the return direction based on the loopback 706. An OTDR 708 and BOSA 710 may be operated as described with reference to FIG. 1, and an optical switch 712 may be operated, via a control signal 714, in a direct parallel configuration. In the configuration including the loopback, the aforementioned measurements may be performed automatically (e.g., without human intervention).

Figure 8A:
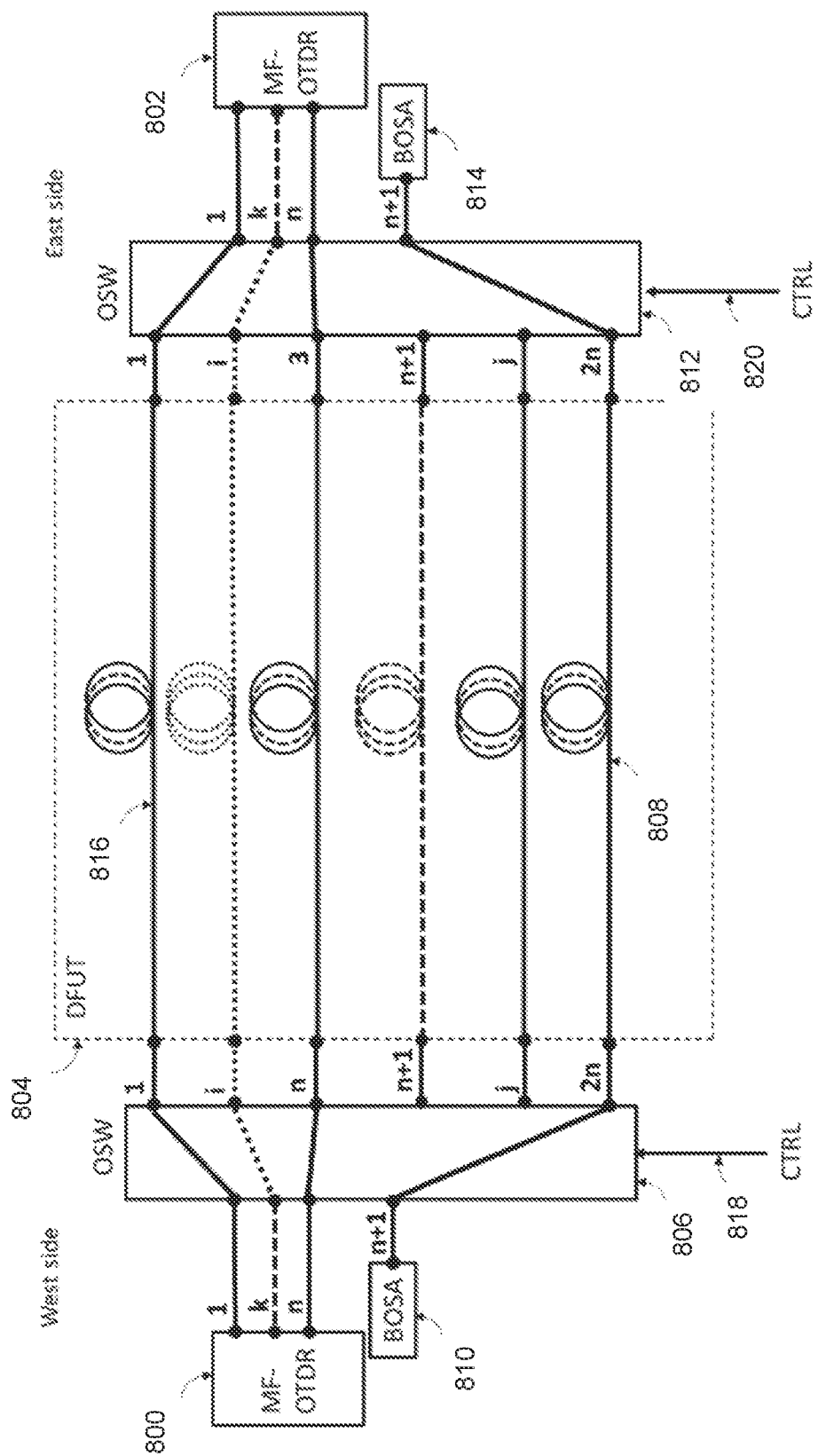
FIG. 8A illustrates a first phase of an implementation of the high speed bidirectional test of dual-fiber link apparatus using two simultaneous multi-fiber OTDRs for bidirectional measurements, in accordance with an example of the present disclosure.
Figure 8B:
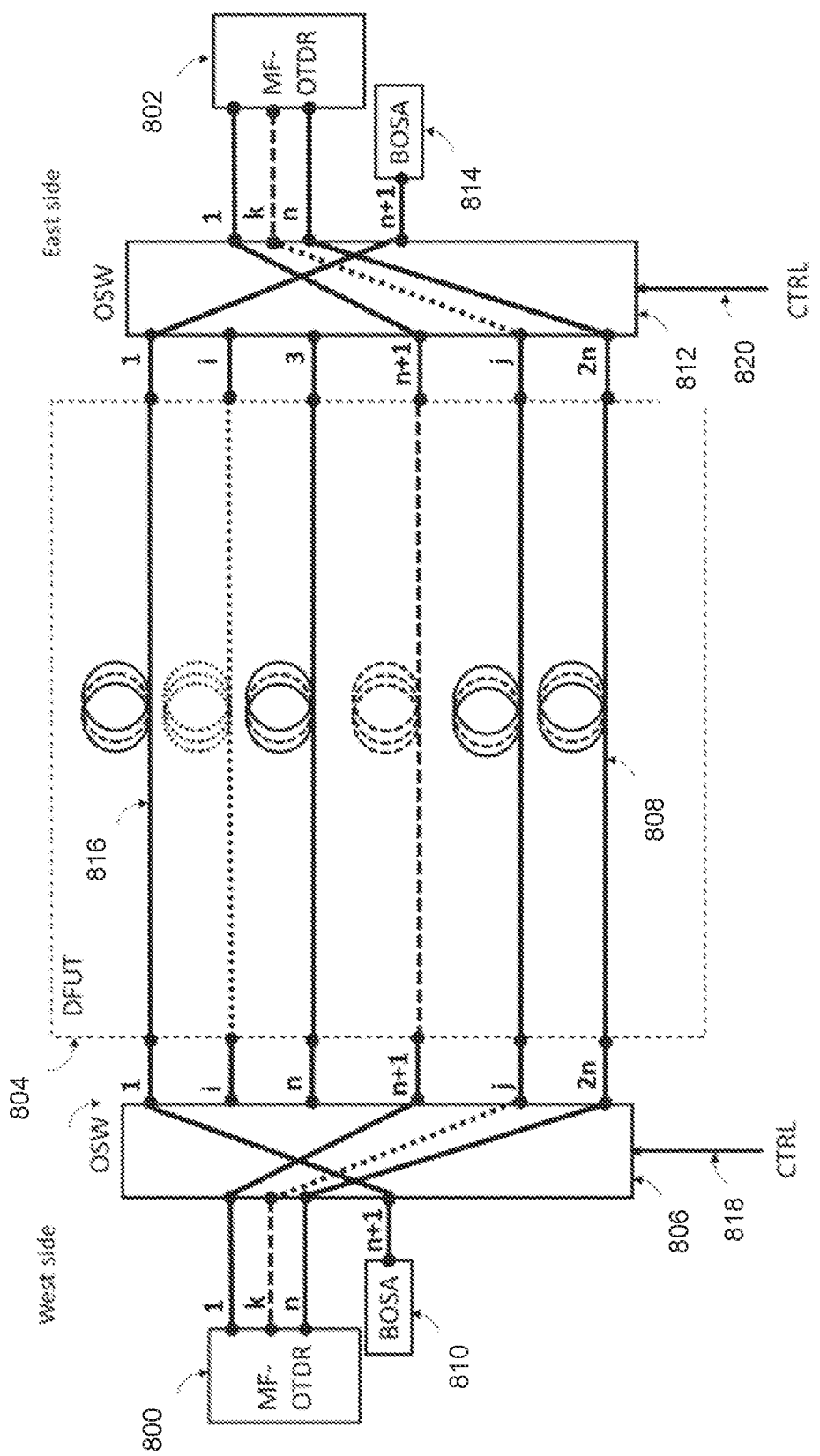
FIG. 8B illustrates a second phase of an implementation of the high speed bidirectional test of dual-fiber link apparatus using two simultaneous multi-fiber OTDRs for bidirectional measurements, in accordance with an example of the present disclosure.

FIG. 8A illustrates a first phase of an implementation of the apparatus 100 using two simultaneous multi-fiber OTDRs for bidirectional measurements, in accordance with an example of the present disclosure. FIG. 8B illustrates a second phase of an implementation of the apparatus 100 using two simultaneous multi-fiber OTDRs for bidirectional measurements, in accordance with an example of the present disclosure.

Referring to FIGS. 1, 8A and 8B, the apparatus 100 may be implemented in configurations using multi-fiber OTDRs which are able to simultaneously test several fibers in parallel. FIGS. 8A and 8B provide an example of an implementation using two simultaneous multi-fiber OTDRs, MF-OTDR 800 and 802 for bidirectional measurements. The FUT 804 ribbon type cable under test may include 2n fibers. Two 2×2n optical switches 806 and 812 may be used to simultaneously connect the fibers to be tested, and a fiber used for communication and data exchange. The test is carried out in two successive phases. During the first phase, as shown in FIG. 8A, the optical switch (OSW) 806 may connect inputs/outputs (I/Os) 1 to n to fibers 1 to n on the west side, while the (OSW) 812 optical switch, connects inputs/outputs (I/Os) 1 to n to fibers 1 to n east side. The west side 2n fiber 808 may be connected via optical switch 806 to BOSA 810 while it is connected via optical switch 812 to BOSA 814. Bidirectional OTDR measurements may thus be performed on fibers connected to ports 1 to n of optical switches while allowing exchanges of data and commands on 2n fiber 808.

During the second phase, as shown in FIG. 8B, the two optical switches (OSW) 806 and 812 may switch by connecting the two MF-OTDRs 800 and 802 to the fibers connected on their ports n+1 to 2n, and by connecting the BOSA 810 and 814 to fiber 1. In this configuration, fibers n+1 to 2n may be tested in parallel, in bidirectional mode using the two MF-OTDRs 800 and 802, while fiber 1 at 816 may be used for the transmission of commands and measurement data. For example, a 12-fiber MPO (Multiple-Fiber Push-On/Pull-off) connector with 12 fibers (e.g., 2n=16) may be tested in two steps, the first for the test of fibers 1 to 6, and the second for the test of the remaining fibers 7 to 12. Communication between the two MF-OTDRs may be provided by fiber 12 during the first phase and then by fiber 1 during the second phase. The optical switches (OSW) 806 and 812 may be respectively controlled via control (CTRL) signals 818 and 820.

The configuration of FIGS. 8A and 8B may be modified for monodirectional reflectometric measurements. In this case, the remote OSW switch 812, the remote BOSA 814, and the MF-OTDR 802 may be removed.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A high speed bidirectional test of dual-fiber link apparatus comprising:
   at least one optical time-domain reflectometer (OTDR);
   at least one optical data transceiver; and
   at least one m×n optical switch optically connected to the at least one OTDR, the at least one optical data transceiver, and at least two fibers of a cable under test, wherein m and n are at least two;
   wherein the at least one m×n optical switch is operable in at least two modes, wherein a first mode of the at least two modes authorizes a fiber of the at least two fibers to communicatively connect to the at least one OTDR, and wherein the first mode of the at least two modes authorizes another fiber of the at least two fibers to communicatively connect to the at least one optical data transceiver; and
   wherein a second mode of the at least two modes authorizes the another fiber of the at least two fibers to communicatively connect to the at least one OTDR, and wherein the second mode of the at least two modes authorizes the fiber of the at least two fibers to communicatively connect to the at least one optical data transceiver.

2. The high speed bidirectional test of dual-fiber link apparatus according to claim 1, wherein the at least one optical data transceiver includes a Bidirectional Optical Sub-Assembly (BOSA).

3. The high speed bidirectional test of dual-fiber link apparatus according to claim 1, wherein the at least one OTDR includes a multi-fiber OTDR.

4. The high speed bidirectional test of dual-fiber link apparatus according to claim 1, wherein a fiber of the at least two fibers is optically connected to another fiber of the at least two fibers by a loopback.

5. A high speed bidirectional test of dual-fiber link apparatus comprising:
   a first m×n optical switch optically connected to a first optical time-domain reflectometer (OTDR) and a first optical data transceiver; and
   a second m×n optical switch optically connected to a second OTDR and a second optical data transceiver,
   wherein the first and second m×n optical switches are respectively optically connected to first and second opposite ends of at least two fibers of a cable under test, and
   wherein m and n are at least two;
   wherein each of the first and second m×n optical switches is operable in at least two modes, wherein a first mode of the at least two modes authorizes a fiber of the at least two fibers to communicatively connect to the first and second OTDRs, and wherein the first mode of the at least two modes authorizes another fiber of the at least two fibers to communicatively connect to the first and second optical data transceivers, and
   wherein a second mode of the at least two modes authorizes the another fiber of the at least two fibers to communicatively connect to the first and second OTDRs, and wherein the second mode of the at least two modes authorizes the fiber of the at least two fibers to communicatively connect to the first and second optical data transceivers.

6. The high speed bidirectional test of dual-fiber link apparatus according to claim 5, wherein each of the first and second optical data transceivers includes a Bidirectional Optical Sub-Assembly (BOSA).

7. The high speed bidirectional test of dual-fiber link apparatus according to claim 5, wherein each of the first and second OTDRs includes a multi-fiber OTDR.

8. The high speed bidirectional test of dual-fiber link apparatus according to claim 5, wherein a fiber of the at least two fibers is optically connected to another fiber of the at least two fibers by a loopback.

9. A method for high speed bidirectional test of dual-fiber link, the method comprising:
   optically connecting at least one m×n optical switch to at least one optical time-domain reflectometer (OTDR), wherein m and n are at least two;
   optically connecting the at least one m×n optical switch to at least one optical data transceiver;
   testing, based on the optical connection of the at least one m×n optical switch to the at least one OTDR and to the at least one optical data transceiver, at least two fibers of a cable under test, including performing a bidirectional measurement by simultaneously testing each fiber of the at least two fibers of the cable under test in a first direction, and simultaneously testing each fiber of the at least two fibers of the cable under test in a second opposite direction;
   operating the at least one m×n optical switch in a first mode that authorizes a fiber of the at least two fibers to communicatively connect to the at least one OTDR, and another fiber of the at least two fibers to communicatively connect to the at least one optical data transceiver; and
   operating the at least one m×n optical switch in a second mode that authorizes the another fiber of the at least two fibers to communicatively connect to the at least one OTDR, and the fiber of the at least two fibers to communicatively connect to the at least one optical data transceiver.

10. The method according to claim 9, wherein the at least one optical data transceiver includes a Bidirectional Optical Sub-Assembly (BOSA).

11. The method according to claim 9, wherein the at least one OTDR includes a multi-fiber OTDR.

12. The method according to claim 9, further comprising:
   exchanging, via a fiber of the at least two fibers, measurement data related to the simultaneous testing in the first direction.

13. The method according to claim 12, further comprising:
   exchanging, via another fiber of the at least two fibers, measurement data related to the simultaneous testing in the second direction.

14. The high speed bidirectional test of dual-fiber link apparatus according to claim 1, wherein the at least one optical time-domain reflectometer (OTDR) is to perform a bidirectional measurement via a simultaneously test of each fiber of the at least two fibers of the cable under test in a first direction, and a simultaneously test of each fiber of the at least two fibers of the cable under test in a second opposite direction.

15. The high speed bidirectional test of dual-fiber link apparatus according to claim 1, wherein the at least one OTDR is to exchange measurement data related to simultaneous testing in the first direction.

16. The method according to claim 12, wherein the least one OTDR is further to exchange, via another fiber of the at least two fibers, measurement data related to the simultaneous testing in the second direction.

17. The high speed bidirectional test of dual-fiber link apparatus according to claim 5, wherein the first OTDR and the second OTDR are to perform a bidirectional measurement by simultaneously testing each fiber of the at least two fibers of the cable under test in a first direction, and simultaneously testing each fiber of the at least two fibers of the cable under test in a second opposite direction.

18. The high speed bidirectional test of dual-fiber link apparatus according to claim 5, wherein the first OTDR and the second OTDR are to exchange measurement data related to simultaneous testing in the first direction, and wherein the first OTDR and the second OTDR are further to exchange, via another fiber of the at least two fibers, measurement data related to the simultaneous testing in the second direction.

* * * * *